United States Patent [19]

Kokubo et al.

[11] Patent Number: 4,699,272

[45] Date of Patent: Oct. 13, 1987

[54] BILL PAYING MACHINE

[75] Inventors: Eiichi Kokubo; Kyoichi Osako; Akira Hirata; Mizuo Oshita; Toshiaki Ito; Kazuyuki Seki; Eiichi Yoshikawa; Osamu Miyazaki, all of Tokyo, Japan

[73] Assignee: Laurel Bank Machine Co., Ltd., Tokyo, Japan

[21] Appl. No.: 646,519

[22] Filed: Sep. 4, 1984

[30] Foreign Application Priority Data

Sep. 12, 1983 [JP] Japan ................................ 58-167974

[51] Int. Cl.[4] ......................... B07C 5/36; G06F 15/30

[52] U.S. Cl. .................................... 209/534; 221/191; 235/379; 271/189; 271/306; 312/239; 312/287

[58] Field of Search ......................... 209/534; 235/379; 271/306, 177, 189, 84, 184, 185, 299, 302, 303; 221/252, 191; 186/37; 312/211, 239, 287

[56] References Cited

U.S. PATENT DOCUMENTS

| | | | |
|---|---|---|---|
| 4,134,537 | 1/1979 | Glaser et al. | 235/379 |
| 4,343,582 | 8/1982 | Lundblad et al. | 271/303 |
| 4,348,656 | 9/1982 | Gorgone et al. | 209/534 |
| 4,595,828 | 6/1986 | Lundblad | 235/379 |

*Primary Examiner*—Robert B. Reeves
*Assistant Examiner*—Donald T. Hajec
*Attorney, Agent, or Firm*—Fleit, Jacobson, Cohn & Price

[57] ABSTRACT

A bill paying machine is disposed between two operators to be used in common by them. The bill paying machine comprises a machine body and a door openably mounted on the front portion of the machine. Disposed inside the machine body are bill containers for holding bills therein, a drawing-out or paying-out device for paying out bills from the bill containers, and a transport device for feeding the bills to the front door. The front door comprises two paying outlets and a distributing device for receiving the bills from the transport device of the machine body and directing the bills to one of two paying outlets in accordance with an instruction by an operator.

2 Claims, 20 Drawing Figures

BILL PAYING MACHINE

BACKGROUND OF THE INVENTION

The present invention relates to a bill-paying machine for two over-the counter operators (tellers), which is disposed over a counter at such premises as a bank between the two operators and is used jointly by both operators.

As a bill-paying machine, there has heretofore been proposed one wherein a single paying outlet for common use by two operators is provided on the front surface and an instruction means indicating which operator has issued an instruction for paying out the bill is provided on both sides of the paying outlet. In such a conventional bill-paying machine, however, there is a possibility that, when operators are concentrating their attention on serving clients over the counter, the instruction shown by the instruction means may be overlooked, with the result that one operator may receive bills which should have been received by the other operator. Also, requests have been made to make improvements to the bill-paying machine, since it has not been possible for the other operator to use the bill-paying machine until the bills paid out by one operator's instruction for payment are taken out from the paying outlet, and also since operational efficiency has been poor.

To meet such needs, a bill-paying machine as shown in FIGS. 1 and 2 has heretofore been proposed. The arrangement of this bill-paying machine is such that a first paying outlet 4 and a second paying outlet 5 are disposed vertically on the front surface 3*a* of a housing 3 in correspondence with a first teller's machine (a device for inputting an instruction for payment) 1 and a second teller's machine 2 operated by each of the operators. Further, when an instruction for payment is issued from the first or second teller's machine, a required amount of bills are taken out consecutively from bill containers 6 and 7 inside the housing body 3, and the bills taken out are transported vertically by means of a first transport device 8 and then accumulated on a second transport device 10 by means of an accumulating car 9. Then, the accumulated bills 11 are sent to a paying outlet corresponding to the teller's machine that issued the instruction for payment. However, this bill-paying machine has the distributing device 12 disposed upwardly of the bill containers 6 and 7. As a result, the range (and the like) within which the bills may be moved vertically is restricted by the dimension $L_1$ of the space left between the ceiling 3*b* of the frame 3 and the bill container 6, depending on the dimension and form of the distributing device 12. As a result, the height of the paying outlets 4 and 5 is restricted. In addition, there has been a problem in that since the accumulating car 9, the second transport device 10, the distributing device 12, etc. are secured to the frame 3 in transverse alignment, the distributing device 12 created a hindrance to the maintenance of such internal devices as the second transport device 12.

SUMMARY OF THE INVENTION

The present invention has been proposed in view of the aforementioned circumstances, and the object of the invention is to provide a bill-paying machine for two tellers, wherein the dimensions of the distributing device and the scope for movement of bills by means of the distributing device are not restricted by such matters as the open space inside the housing containing bill containers, with the result that the height of the paying outlets for sending out bills by means of the distributing device can be the optimum height for facilitating operator handling, and that the distributing device will not serve as a hindrance to providing maintenance to devices inside the housing. The characteristic feature of the bill-paying machine according to the invention is that the front portion of the housing constituting the external appearance is of the door type, and the distributing device is provided inside the front door.

According to the present invention, there is provided a bill-paying machine disposed between two operators situated on right- and left-hand sides and used in common by the two operators, comprising a box-like body whose housing constituting the external appearance thereof has an opening in its front, a front door openably installed at a front end of said body in such a manner as to cover the opening of said body, bill containers provided inside said body for housing bills, a paying-out device for paying out from said bill containers a predetermined number of bills in accordance with an instruction for payment issued by an operator, a transport device for feeding the bills paid out by said paying-out device to the front door side, said bill container being detachably installed from the front side, two paying outlets corresponding to each operator formed in a row on the right- and left-hand sides, and a distributing device provided inside said front door for distributing and sending out the bills fed by said transport device to each paying outlet.

DESCRIPTION OF THE DRAWINGS

Other objects and advantages of the present invention will become apparent from the following description made with reference to the accompanying drawings, in which:

FIGS. 3 to 8, inclusive, show a first embodiment of the invention; in which FIG. 3 is a schematic side elevational view;

FIG. 4 is a perspective view;

FIG. 5 is a perspective view with the front door open;

FIG. 6 is a cross-sectional view taken along the line VI—VI of FIG. 5;

FIG. 7 is a cross-sectional view taken along the line VII—VII of FIG. 6;

FIG. 8 is a cross-sectional view taken along the line VIII—VIII of FIG. 7;

FIGS. 9 to 20, inclusive, show a second embodiment of the invention; in which FIG. 9 is a schematic side elevational view;

FIG. 10 is a perspective view of a distributing device;

FIG. 11 is a perspective view with the front door open;

FIG. 12 is a cross-sectional view taken along the line VII—VII of FIG. 11;

FIG. 13 is a cross-sectional view taken along the line VIII—VIII of FIG. 12;

FIG. 14 is a cross-sectional view taken along the line XIV—XIV of FIG. 12;

FIG. 15 is a cross-sectional view taken along the line XV—XV of FIG. 12;

FIG. 16 is a perspective view of a shutter;

FIG. 17 is a cross-sectional view taken along the line XVII—XVII of FIG. 13;

FIG. 18 is a cross-sectional view taken along the line XVIII—XVIII of FIG. 13; and FIGS. 19 and 20 are diagrams explaining the movement of a receiving plate.

DESCRIPTION OF THE PREFERRED EMBODIMENTS

Embodiments of the present invention will be non described in detail with reference to the accompanying drawings.

FIGS. 3 to 8 show a first embodiment of the invention.

Figure 1:
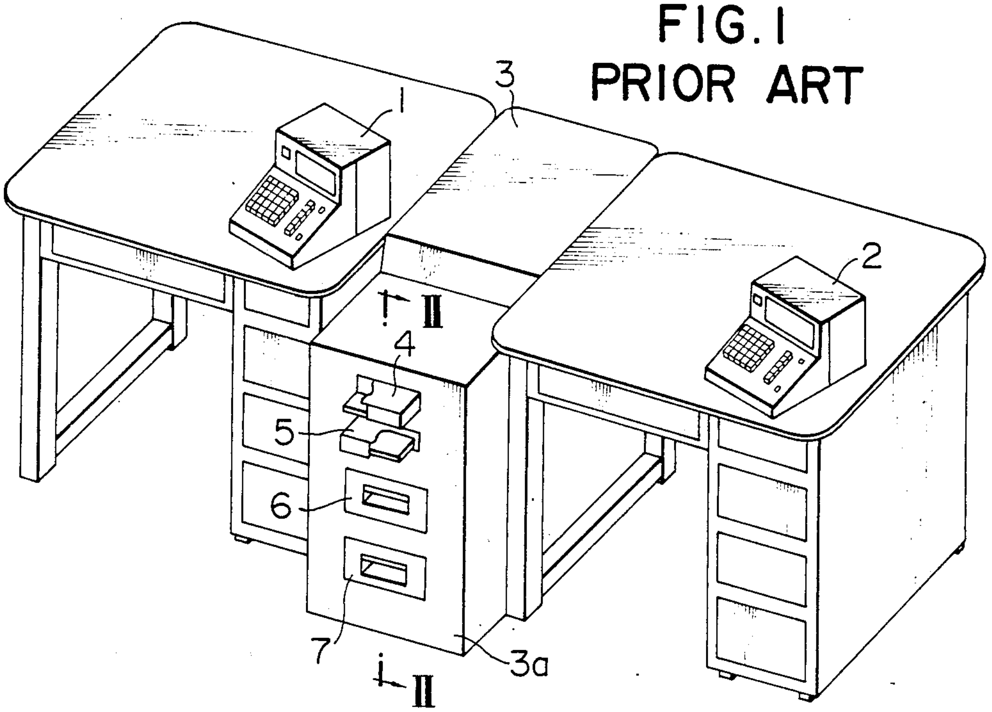
FIG. 1 PRIOR ART
FIG. 1 is an external view of a conventional bill-paying machine.
Figure 2:
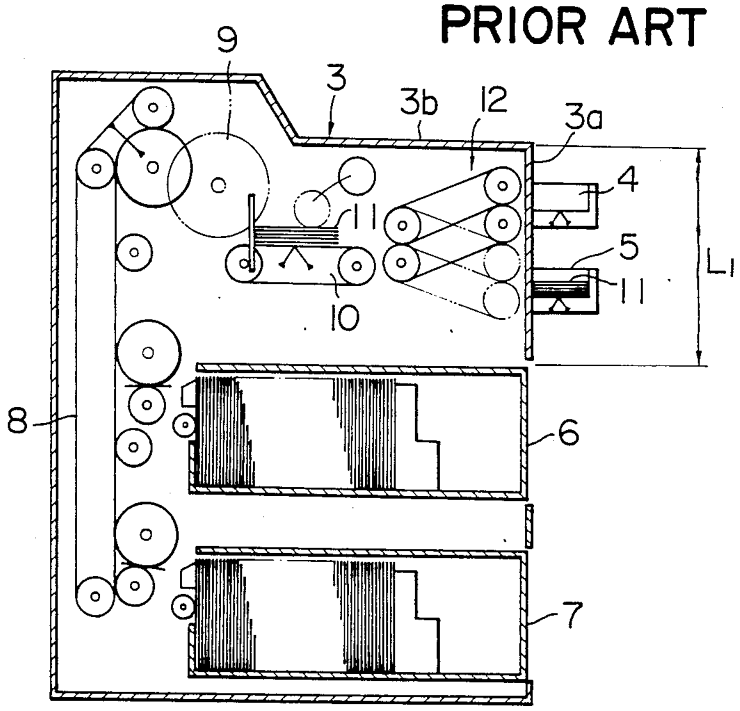
FIG. 2 PRIOR ART
FIG. 2 is a cross-sectional view taken along the line II of FIG. 2.
Figure 3:
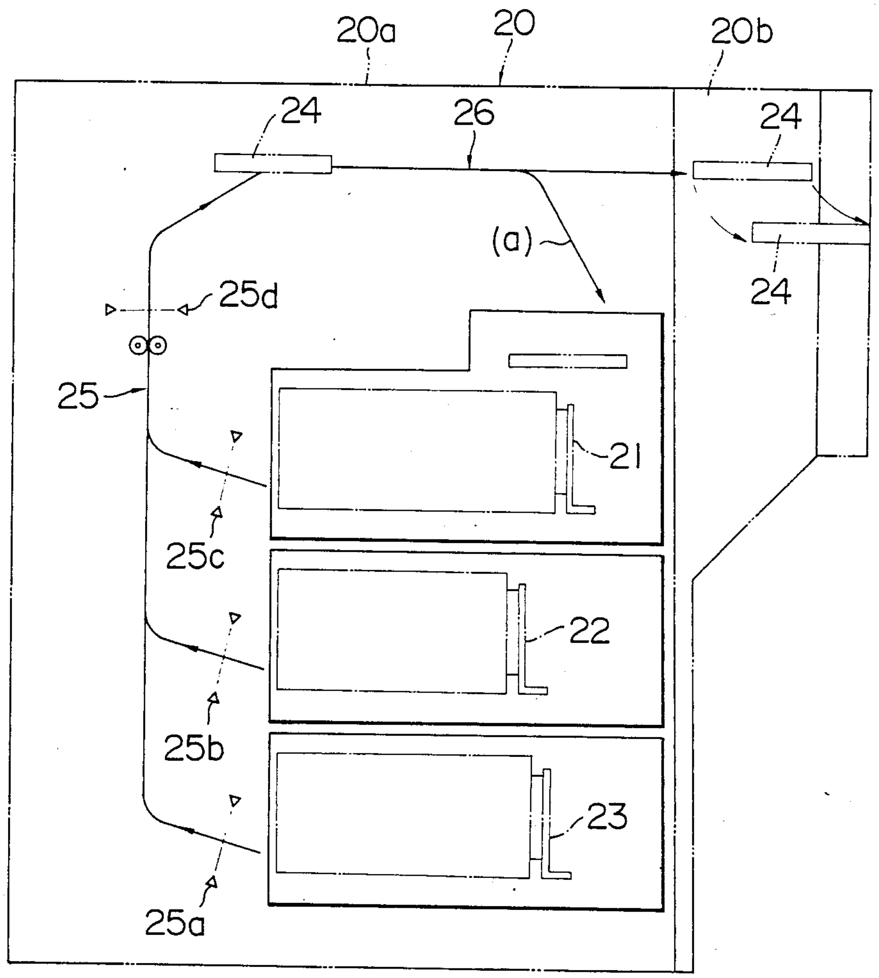
Figure 5:
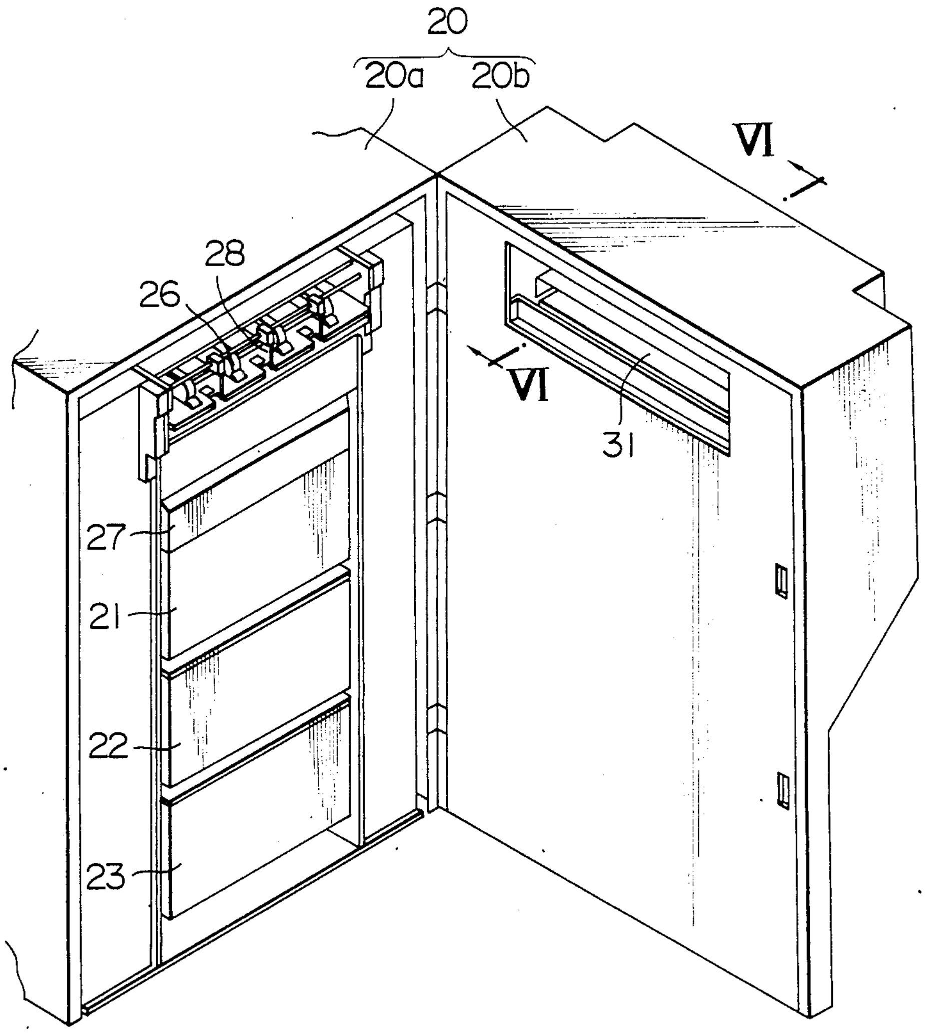

Referring to FIGS. 3 and 5, the reference numeral 20 denotes a housing constituting the external appearance of the embodiment. The front section of this housing 20 is of the door type and comprises a box-like body 20*a* with its front (the right-hand side in FIG. 3 open as well as a front door 20*b* covering the front of the body 20*a*.

As for the body 20*a*, its widthwise dimension W is set to be slightly more than twice the longitudinal dimension $l_1$ of the bill. Bill containers 21, 22, and 23 are mounted in a vertical row at a position closer to the front inside the body 20*a*. The bill containers 21, 22, and 23 are designed to contain bills with their longitudinal sides facing the widthwise direction of the body 20*a*, and bill-pickup ports are formed at their rear. The bill containers 21, 22, and 23 are so arranged that an open space is left on the ceiling side of the body 20*a* and that the centers of the body 20*a* and the widthwise dimension of the bill containers align, and, at the same time, they are secured in such a way that they can be mounted or dismounted with the front door 20*b* open. At the rear of the containers 21, 22, and 23, i.e., at a position closer to the rear inside the body 20*a*, is provided a paying-out device 25 which delivers a required volume of bills from the containers 21, 22, and 23 according to an input signal from a teller's machine (not shown), and feeds the bills consecutively upward to form accumulated bills 24. In addition, a transport device 26 for feeding the accumulated bills 24 forward is provided in the open space between the uppermost container 21 and the ceiling of the body 20*a*. This transport device 26 delivers the accumulated bills 24 along the central line of the width of the body 20*a*. When trouble occurs with the accumulated bills 24, the transport device 26 rejects the bills into a lower reject box 27 (shown in FIG. 6), as shown by an arrow (a) in FIG. 3, by a signal from detecting devices 25*a* to 25*d*, etc., provided along the feeding route of the paying-out device 25. When there is no trouble, the transport device 26 delivers the accumulated bills 24 to the front door 20*b* by means of a kicking mechanism 28.

Figure 4:
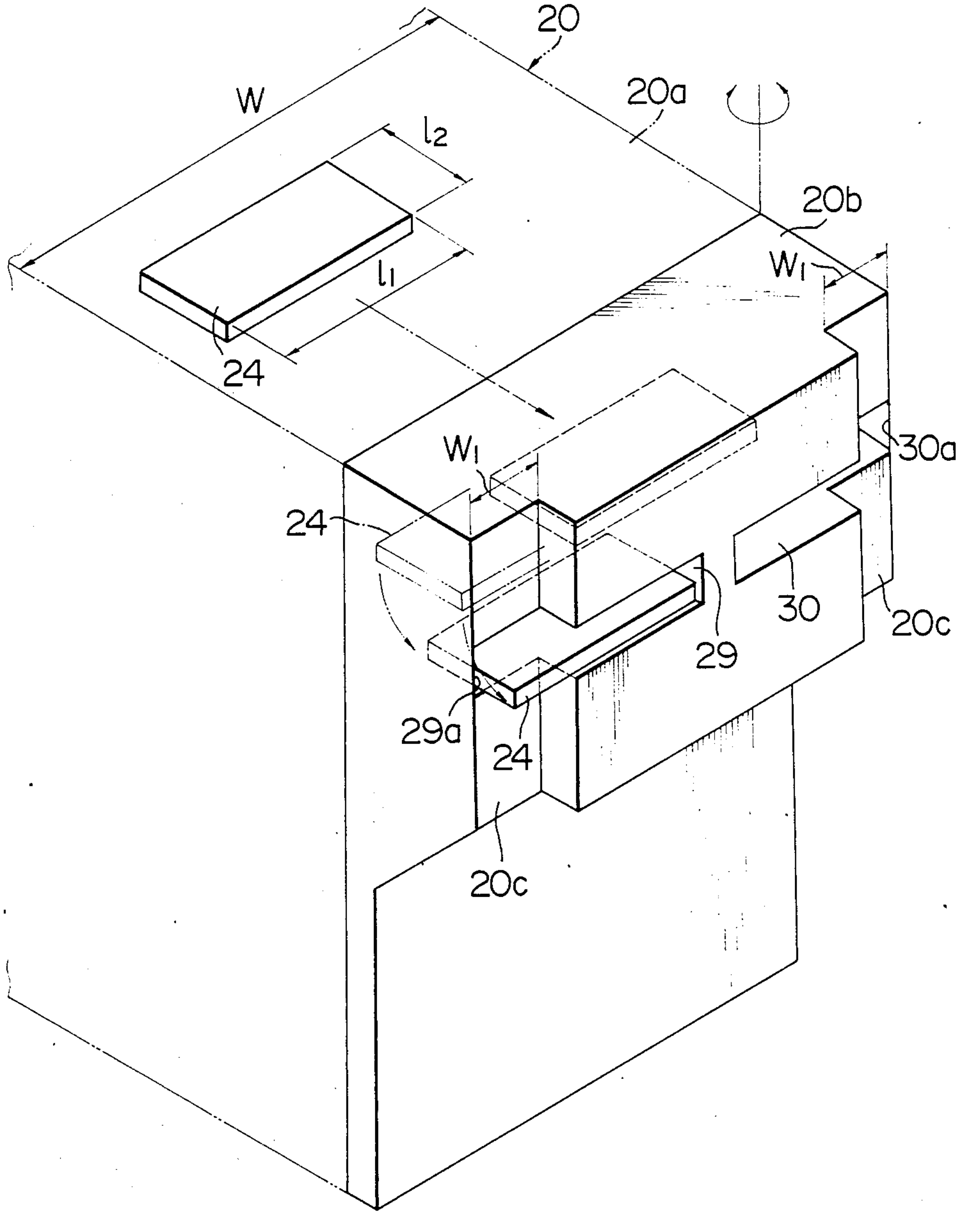

The front door 20*b* is formed with its widthwise dimension adjusted to that of the body 20*a*, and is installed openably on the front of the body 20*a* by means of a hinge or the like. A first paying outlet 29 and a second paying outlet 30 are provided in a row on the left- and right-hand sides of the front surface of the front door 20*b*, as shown in FIG. 4. Also, as shown in FIG. 5, inside the front door 20*b* is provided a distributing device 31 which receives the accumulated bills 24 fed from the transport device 27 and distributes the bills 24 to the paying outlet from which an instruction for payment has been issued.

The paying outlets 29 and 30 are arranged at the same height appropriately distanced from the upper edge of the front door 20*b*. The height for facilitating handling by over-the-counter operators is also taken into consideration in determining the position of this height. A step 20*c* recessed at an appropriate widthwise dimension $W_1$ is formed at both edges of the door 20*b* where the outside edges 29*a* and 30*a* of the paying outlets 29 and 30 are located. This step 20*c* means that the bills that are delivered to the paying outlets 29 and 30 have their corners substantially projected to only the corresponding over-the-counter operator. These corners serve as the portions for grabbing, and hence facilitate the taking out of the bills at the same time as preventing the occurrence of such an accident as that in which an operator receives by mistake the bills which should be taken by the other operator.

Figure 6:
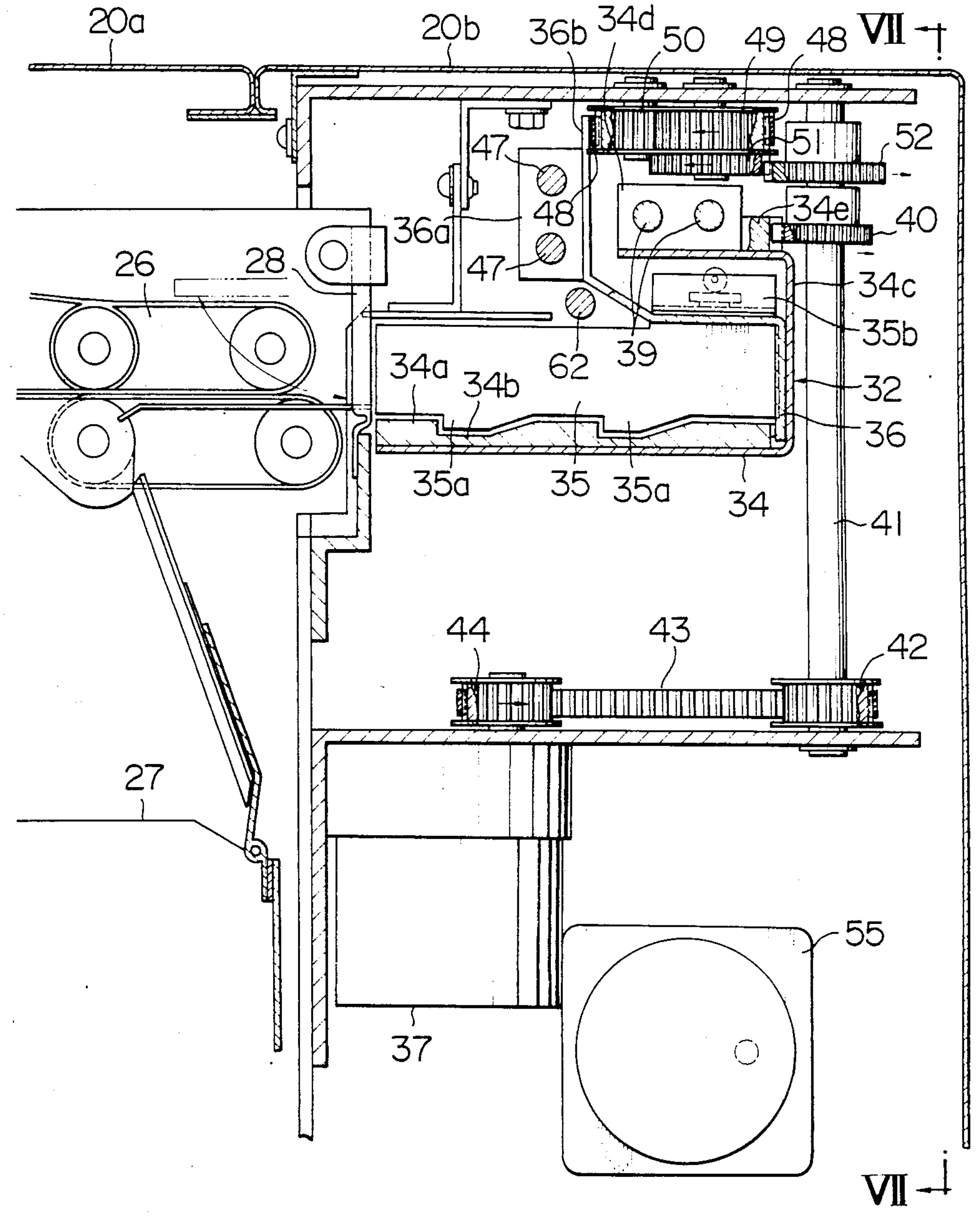
Figure 7:
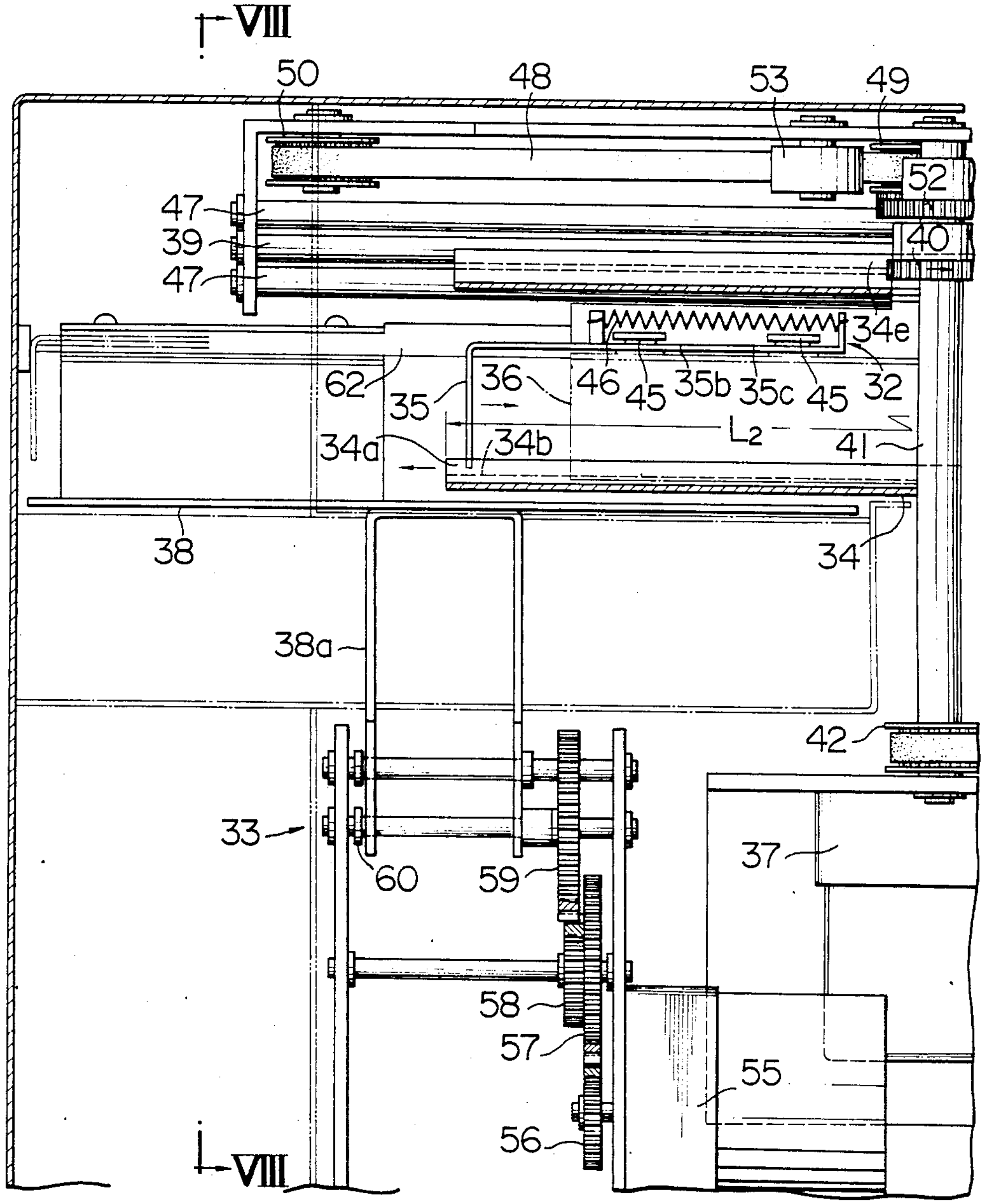
Figure 8:
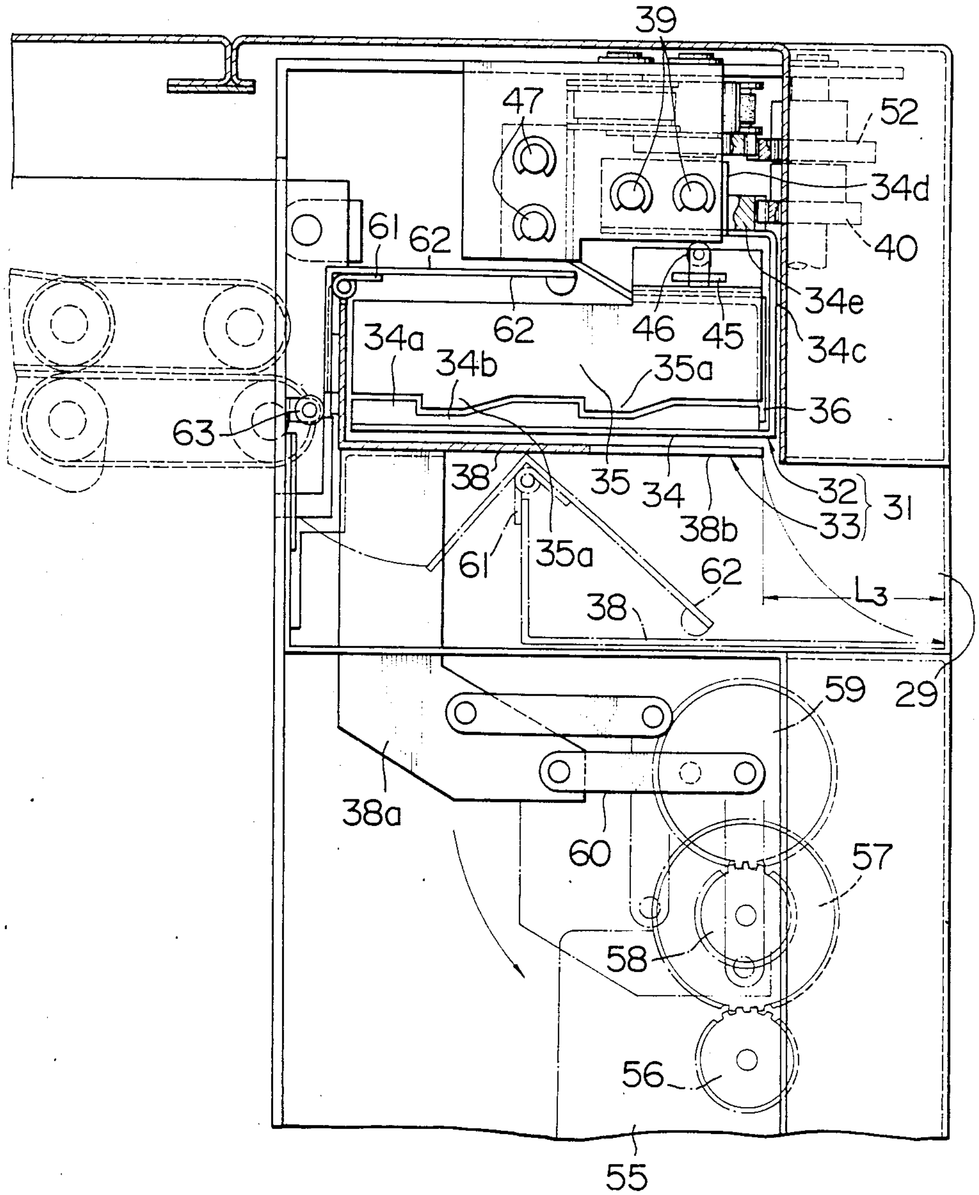

Next, description will be made of the distributing device 31 with reference to FIGS. 6 to 8.

The distributing device 31 has a horizontal feed mechanism 32, which is located at a height opposing the transport device 26 higher than the paying outlets 29 and 30, and a vertical feed mechanism 33, each of which is provided at both sides at a height such as to be between the horizontal feed mechanism 32 and each paying outlet 29 and 30.

The horizontal feed mechanism 32 includes the following: a receiving plate 34 which remains on standby in the center of the widthwise direction and receives the accumulated bills 24 fed from the transport mechanism 26; a pair of side plates 35 covering both sides of the receiving plate 34; a front plate 36 disposed in such a manner as to stand upright in front of the receiving plate 34 so as to prevent the bills from falling frontwardly and also serving as a support for both side plates 35; and a motor 37 operated in accordance with an instruction for payment from each teller's machine and serving as a driving source for moving the receiving plate 34 and side plates 35 and 35. The horizontal feed mechanism 32 moves the receiving plate 34 in a direction opposite to the paying-out side, and, at the same time, moves the side plates 35 to the paying-out side and then pushes the bills 24 on the receiving plate 34 horizontally by means of the side plates 35 and mounts the bills 24 onto the paying-out plate 38 which remains on standby over the respective paying outlets 29 and 30 and at a position slightly lower than the receiving plate 34. To describe a mechanism for moving the receiving plate 34 and side plates 35 and 35, the receiving plate 34 has a groove 34*b* on a bottom portion 34*a* for mounting the bills 24, along the widthwise direction of the door 20*b*. Further, the widthwise dimension $L_2$ of the bottom portion 34*a* is set to be slightly larger than the length $L_1$ of the longitudinal side of the bills 24, and a block 34*d* is provided on the upper end of an upright wall 34*c* rising from the front end of the bottom 34*a*. This block 34*d* fits slidably with guide shafts 39 and 39 extending in the widthwise direction of the door 20*b*, and a rack 34*e* fixed to the block 34*d* is engaged with a gear 40. This gear 40 is fixed to a driving shaft 41 and is connected to the motor 37 via a pulley 42 on the shaft, a timing belt 43 and a pulley 44. Meanwhile, each side plate 35 has a projection 35*a* facing the inside of the groove 34*b* as well as an upper wall portion 35*b* parallel to the bottom portion 34*a*. The upper wall portion 35*b* has a long hole 35*c* in its widthwise direction, and each side plate 35 is movable in the direction of its width and is connected to the front plate 36 by means of a pin 45 inserted into the long hole 35c. One end (the left-hand side in FIG. 7) of each side plate is connected to the front plate 36, while the other end is urged outwardly by means of a resilient member 46 connected to an end portion of the front plate 35. Moreover, the front plate 36 has, on the upper end thereof, a block 36a and a claw 36b for the timing belt. This block 36a is fitted slidably with guide shafts 47 and 47 extending in the direction of the width of the door 20b, and the claw 36b is engaged with the timing belt 48. Thus, the block 36a is adapted to move in the direction of the width by means of the timing belt 48. This timing belt 48 is wound around the external periphery of a pulley 49 disposed in proximity with the driving shaft 41 in the center of the widthwise direction of the cover, and a pulley 50 pivotally supported at each end of the door 20b so as to push the timing belt 48 against the claw 36b. As a gear 51 formed integrally with the pulley 49 is engaged with a gear 52 fixed to the driving shaft 41, the timing belt 48 is adapted to rotate in the opposite direction to the driving shaft 41. Furthermore, in the vicinity of the pulley 49 is provided a tensioner roller 53 for adjusting tension by pushing the timing belt 48. Additionally, the rotating direction, etc., of the motor 37 is subjected to control by a control device (not shown), so that the receiving plate 34 and the side plates 35 and 35 move in tune with the timing of the movement of the vertical feed mechanism 33. By means of such mechanism, when the bills 24 are placed on the receiving plate 34, the motor 37 is driven in the forward direction, and the receiving plate 34 moves in the direction opposite to the paying-out direction via the gear 40, and, at the same time, the front 36 and the side plates 35 and 35 move to the paying-out side via the gear 52 and the timing belt 48, the distance of the respective movement being about one half of the longitudinal length of the bills. Next, the bills 24 on the receiving plate 34 are mounted on the paying-out plate 38 which remains on standby on the paying-out side. Then, when the paying-out plate 38 is lowered and moves away from its standby position, the motor is reversed and the receiving plate and the side plates 35 return to their original positions so as to wait for the next bills to be sent in.

The vertical feed mechanism includes the following: the paying-out plate 38; a motor 55 operating at an appropriate timing in response to an instruction for payment; a rotary body 59 rotated by the motor 55 via gears 56, 57, and 58; a parallel link mechanism 60 coupling the rotary body 59 and a leg 38a projecting from the lower part of the paying-out plate 38; and a bill holder 62 supported verticaly rotatably at the rear end of the paying-out plate 38 via a hinge 61. The operation of the motor 55 moves the link mechanism 60 downwardly, which, in turn, moves the paying-out plate 38 in the downwardly forward direction while maintaining the paying-out plate 38 horizontally, causing the bills 24 on the paying-out plate 38 to face the paying outlet 29 or 30. At this juncture, the amount of the downward movement of the paying-out plate 38, which is not restricted by the devices inside the body 20a nor the space which they occupy, can be readily adjusted to the height of the paying outlets 29 and 30. Incidentally, a notch 38b is formed at a corner corresponding to the step portion 20c of the paying-out plate 38, and the corner of the bills facing this notch 38b is adapted to protrude from a step portion 29c. Accordingly, as shown in FIGS. 7 and 8, the amount of forward movement $L_3$ from the standby position (the position of receiving bills from the horizontal feed mechanism 32, i.e., that shown by solid lines in the figures) of the paying-out plate 38 to the paying-out position (the position wherein the bills are caused to face the paying outlet 29 and 30, i.e., that shown by long and short dash lines in the figures) is set smaller than the length $L_2$ of the short side of the bills. However, the operating efficiency in taking out the bills is excellent since the bills can be taken out by grabbing the corners of the bills projecting from the step portion 20c. Meanwhile, the arrangement of the bill holder 62 is such that, when the paying-out plate 38 is in the standby position, the downward swinging of the bill holder 62 is restricted by a striking piece 63 whose one end is fixed to the side of the door 20b. Consequently, the bill holder 62 is downwardly swingable only when the paying-out plate 38 is lowered from its standby position, and it holds the bills on the paying-out plate 38 by the force of its own. On the other hand, the arrangement of the motor 55 is such that, when the bills are removed from the paying-out plate 38 in the paying-out position, the motor 55 is rotatably driven in the reverse direction by means of a control device (not shown) having a device for detecting the same, thereby returning the paying-out plate 38 to its standby position. Meanwhile, each vertical feed mechanism 33 at right and left is adapted to operate independently of the other. For instance, when continuously executing instructions for payment from the two operators, the bills 24 based on an instruction for payment from one operator are fed from the transport device 26 to the horizontal feed mechanism 32, and then fed further from the horizontal feed mechanism 32 to one vertical feed mechanism 33. When the paying-out plate 38 of one vertical feed mechanism 33 is lowered from its standby position, the standby position at that time becomes an empty space, and it becomes possible to move the receiving plate 34 of the horizontal feed mechanism 32 to one side, i.e., to move the bills on the receiving plate 32 horizontally in the other direction without interfering with the bills on the other paying-out plate 38. In other words, when bills are sent to the vertical feed mechanism 33 on the side of one operator, and when the paying-out plate 38 of this vertical feed mechanism 33 is lowered, it becomes possible to execute the instruction of the other operator. Accordingly, even when the bill-paying machine is being used by one operator, the waiting time of the other operator can be reduced appreciably, thereby contributing to the efficient operation of activities for both operators. Furthermore, when bills are paid out to both paying outlets 29 and 30 consecutively, as mentioned above, the only requirement in executing the operation of paying out bills to the other operator's side is to secure the space necessary for moving the receiving plate 34 to one operator's side. The amount of forward movement $L_3$ of bills effected by means of the vertical feed mechanism 33 can be established irrespective of the level of work efficiency. Accordingly, the amount of movement $L_3$, which constitutes the amount of forward projection from the paying outlets 29 and 30 is reduced to the minimum dimension necessary for grabbing the bills. Hence, the dimension in the transverse direction of the overall bill-paying machine can be made compact.

Furthermore, in the bill-paying machine according to the first embodiment, when conducting the replacement of the bill containers 21, 22, and 23 or the maintenance of such devices as the transport device 26 inside the body 20a, such parts or devices can be accessed simply by opening the front door 20b, and because of the aforementioned arrangements the distributing device 31 does not constitute a hindrance, thereby facilitating replacement and maintenance work.

Next, a second embodiment of the invention will be described hereinunder with reference to FIGS. 9 to 20. In the second embodiment, identical characters are assigned to essential component parts which are common with those of the first embodiment in order to simplify the description.

Figure 9:
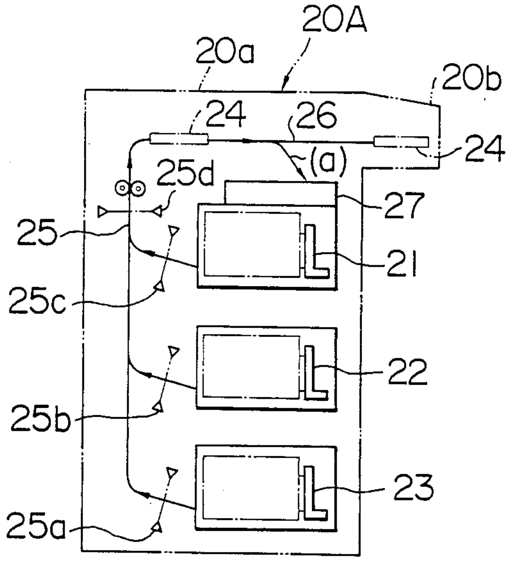

First, referring to FIG. 9, this bill-paying machine, as in the case of the first embodiment, is adapted to distribute the bills sent out from the bill containers 21 to 23 to right and left by means of a distributing device 31A provided inside the front door 20 of a housing 20A. Description will be made hereinafter of this distributing device 31A in detail.

In brief, this distributing device 31A distributes to right and left the bills transported by the transporting device 26 and sent forward by means of the rotating motion of the bill-arranging plate 70. The distributing apparatus 31A basically comprises the following: a receiving plate 71 for mounting the bills; bill-holding plates 72A and 72B for clamping the bills between the same and the receiving plate 71; belts 74 and 75 driven by a motor 73 and horizontally moving the receiving plate 71 and the bill-holding plates 72A and 72B, respectively; solenoids 72A and 72B for operating the bill-arranging plate 70, the bill-holding plates 72A and 72B, etc.; and shutters 77A and 77B for opening and closing the paying outlets 29 and 30.

Figure 12:
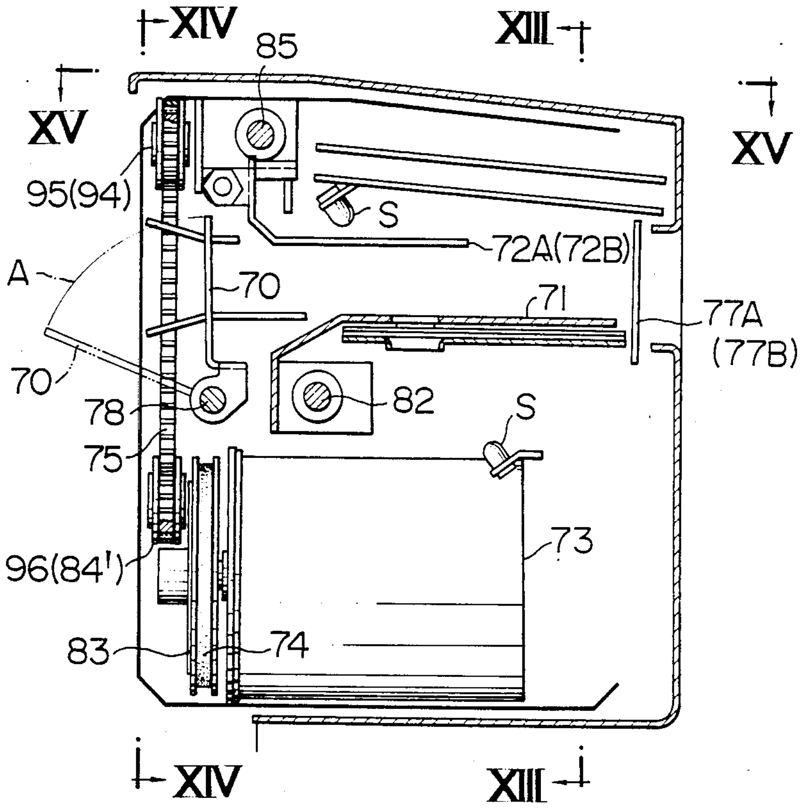
Figure 10:
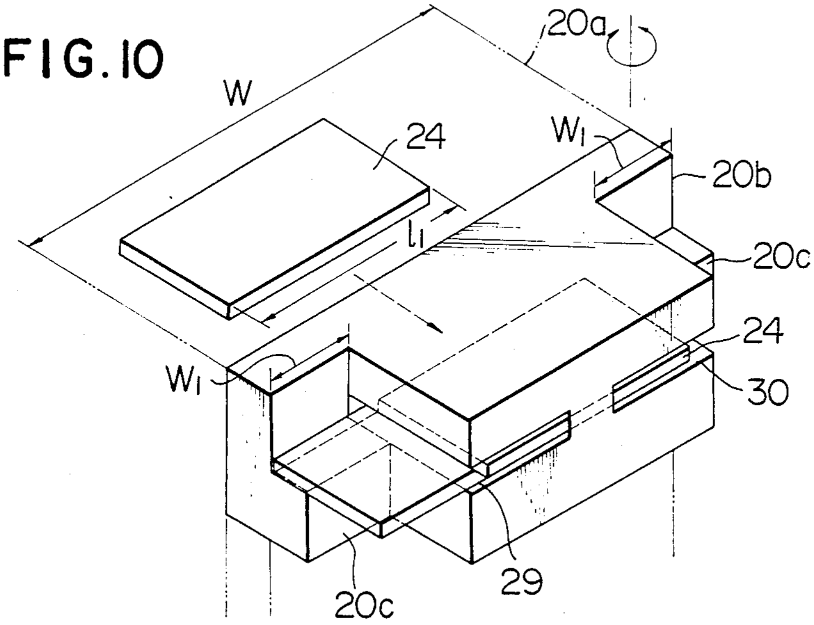
Figure 11:
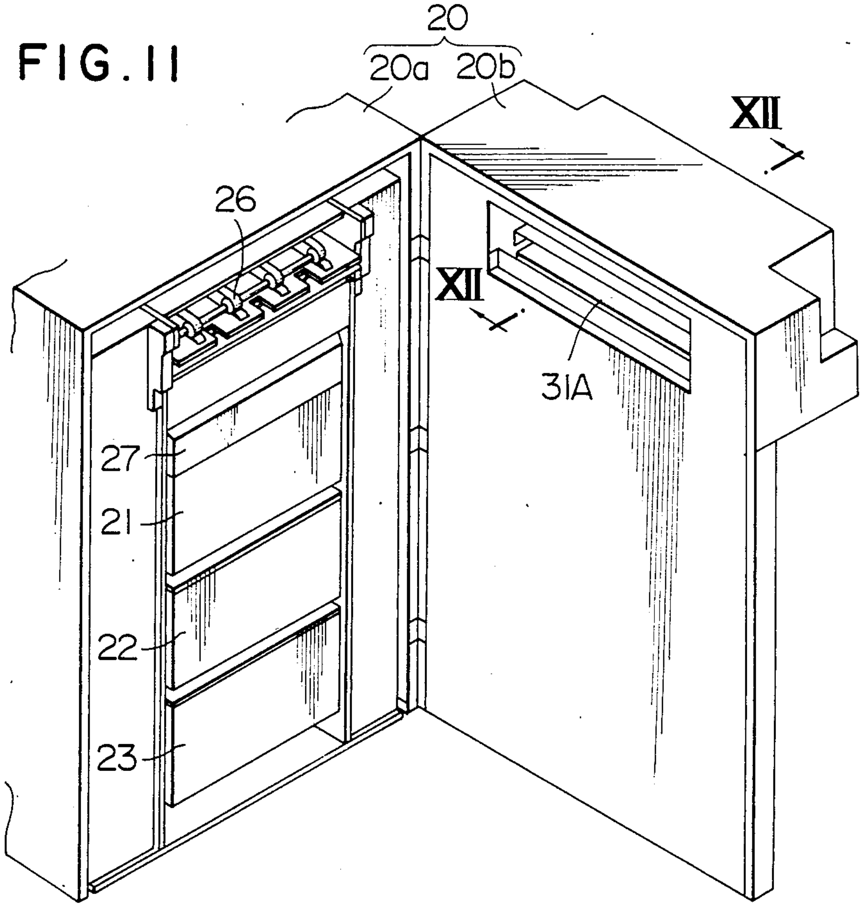
Figure 18:
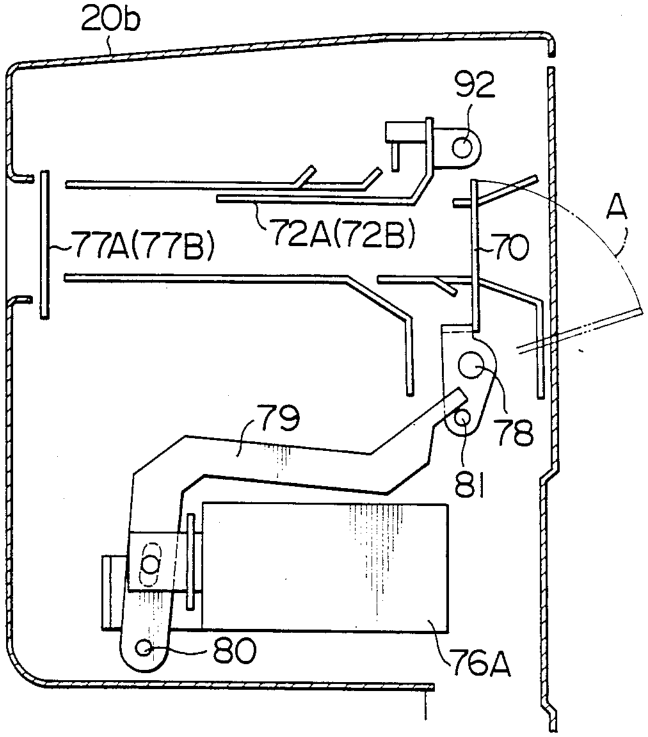

The bill-arranging plate 70 rotates along a locus of rotation, as shown by a chain line in FIGS. 12 and 18, with a shaft 78 as its center. As shown in FIG. 18, the arrangement of the bill-arranging plate 70 is such that it rotates vertically as a link 9 is operated by the solenoid 76A, and is capable of being changed over between a retreat posture (shown by a chain line) for receiving the bills from the transport device 26 and a vertical posture (shown by a solid line) for coming into contact with the rear edges of the bills and arranging them. As the link 79 is operated by the solenoid 76A and rotates with the shaft 80 as its center, as shown in FIG. 18, the link 79 comes into contact with a pin 81 secured onto the bill-arranging plate 70, thereby to rotate the bill-arranging plate 70.

Figure 13:
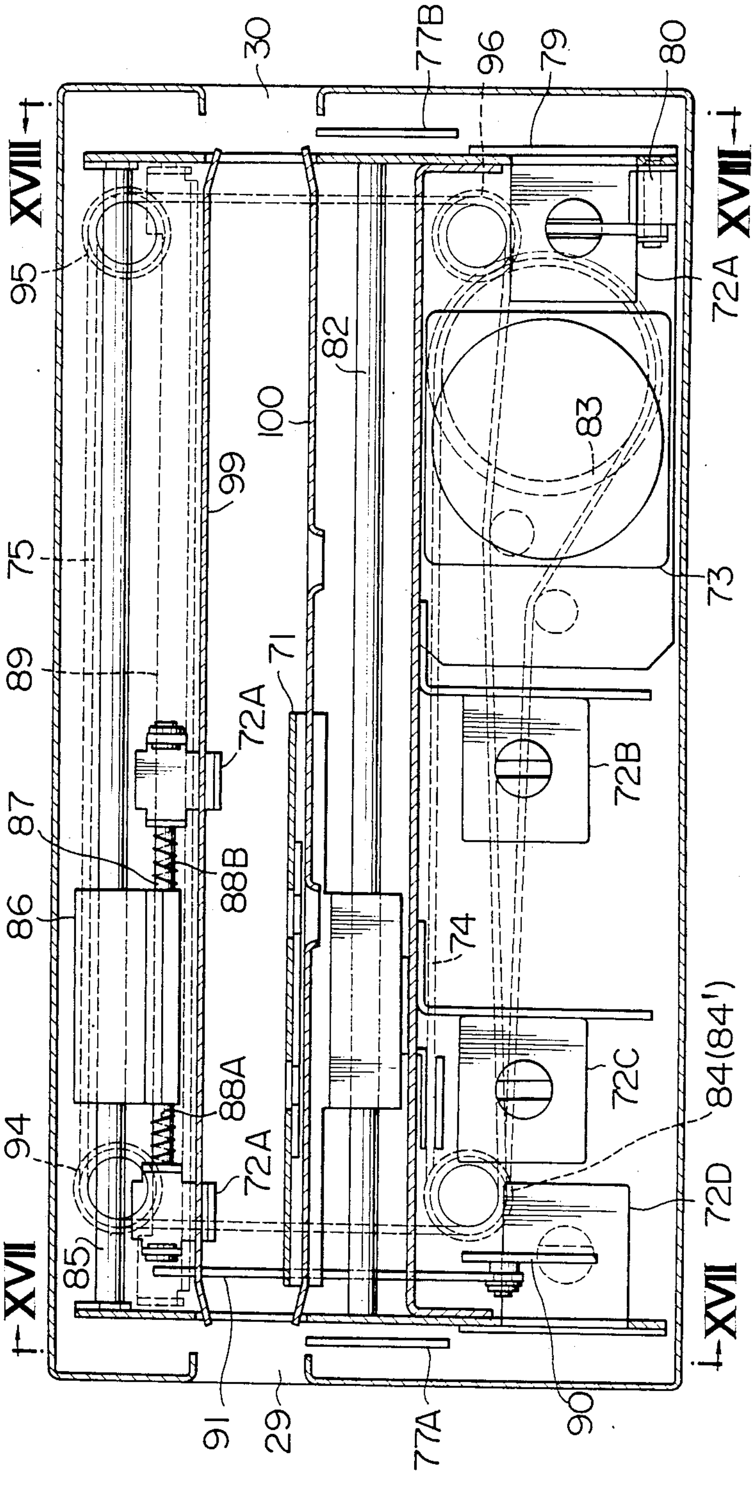
Figure 14:
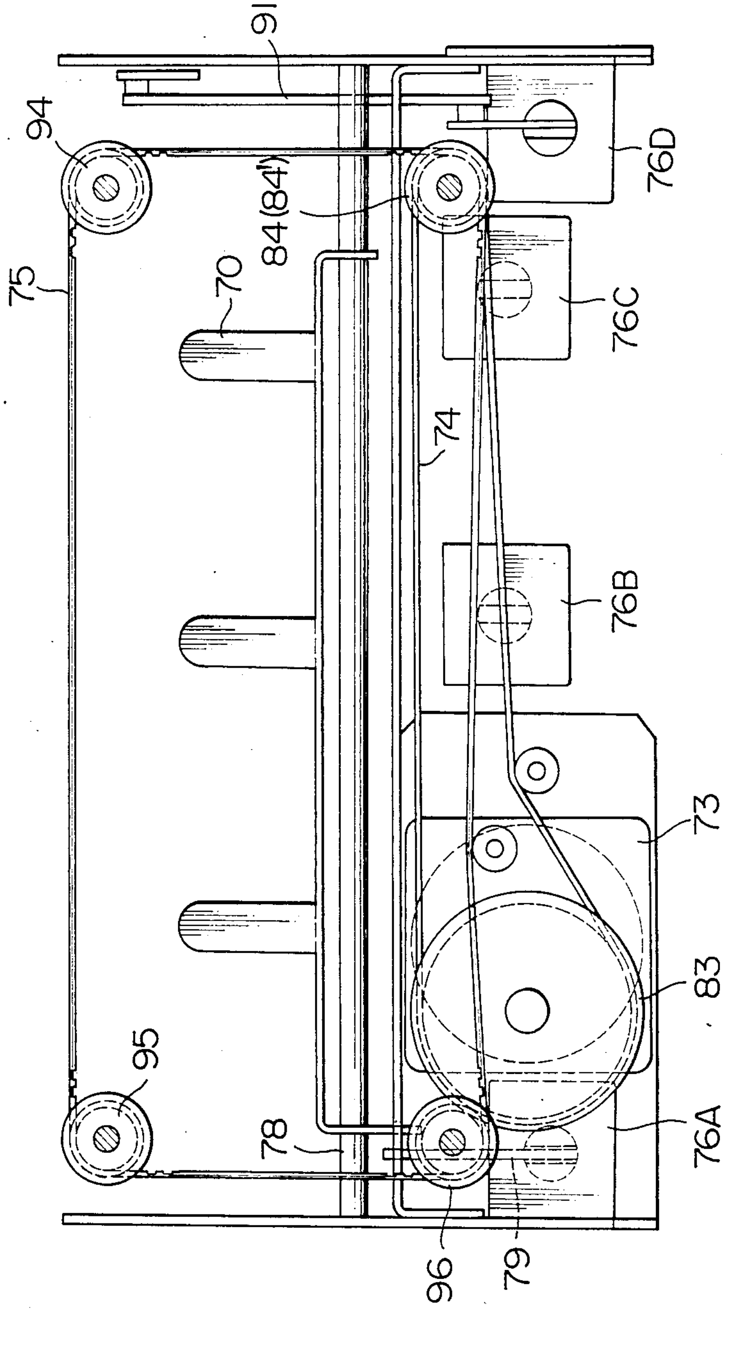
Figure 15:
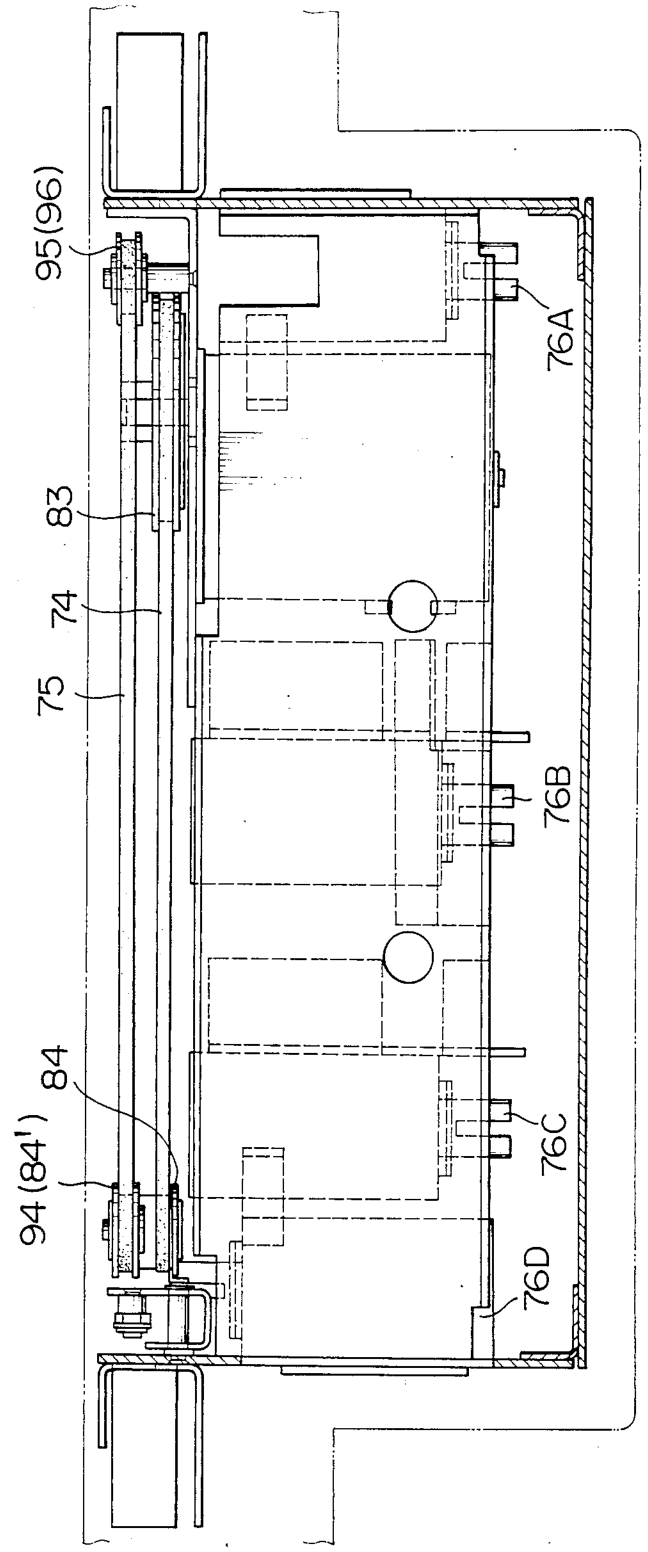
Figure 16:
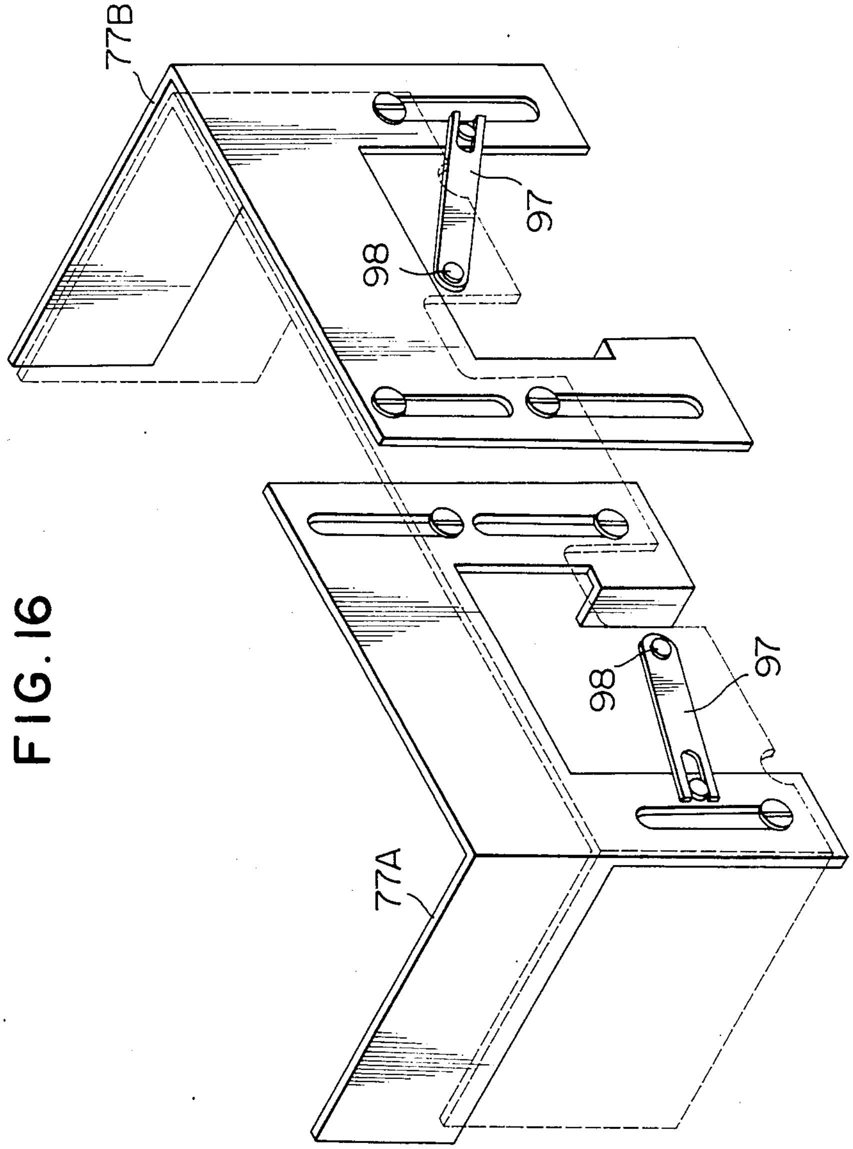
Figure 17:
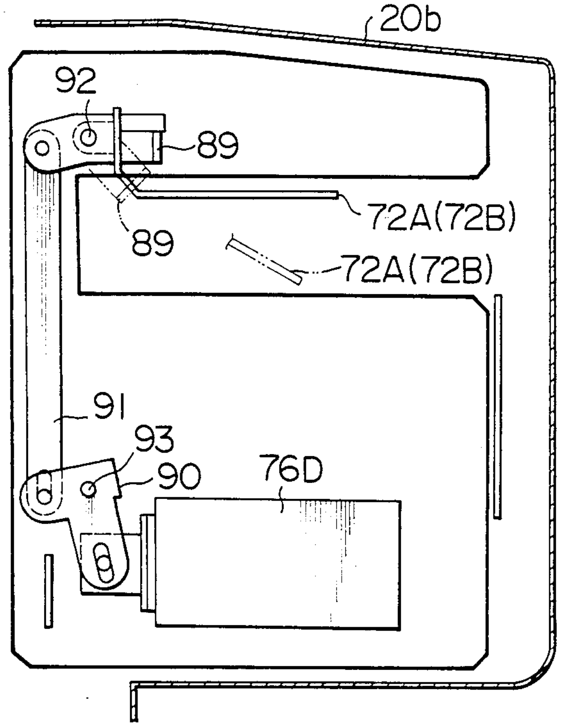

The receiving plate 71 has a widthwise dimension slightly smaller than that of the bills, is movably supported in a transverse direction by means of a horizontal frame 82, as shown in FIGS. 12 and 13, and is adapted to be capable of moving horizontally by means of the belt 74 wound around a driving pulley 83 driven by the motor 73 and around a rotatable intermediate polley 84.

The bill-holding plates 72A and 72B are installed by means of a supporting block 86 axially movably supported by a horizontal frame 85, via a supporting bar 87. The supporting bar 87 supports the bill-holding plates 72A and 72B vertically rotatably, respectively. The bill-holding plates 72A and 72B are respectively urged clockwise as viewed in FIG. 12 by means of torsion springs 88A and 88B, and are adapted to rotate downwardly by means of the torque of the torsion springs 88A and 88B and to clamp the bills between the bill-holding plates 72A and 72B and the vicinity of both ends of the receiving plate 71. Furthermore, the downward rotation of the bill-holding plates 72A and 72B is restrained by a stopper 89. The stopper 89 is coupled with the solenoid 76D via a link 90 and an arm 91 and is adapted to rotate with a shaft 92 as its center. In brief, when the solenoid 76D is actuated, the link 90 rotates with a shaft 93 as its center to push the arm 91 upward, which, in turn, causes the stopper 89 to move pivotally downward with the shaft 92 as its center, as shown by a chain line in FIG. 17, thereby allowing the respective bill-holding plates 72A and 72B to be lowered. Incidentally, the bill-holding plates 72A and 72B move integrally in the horizontal direction as the supporting block 86 is moved by the belt 75. The belt 75 travels as it is wound around a pulley 84' which is secured by the same shaft as that of the aforementioned intermediate pulley 84 driven by the belt 74 and rotates integrally, as well as around idle pulleys 94 to 96.

The shutters 77A and 77B are operated by the solenoids 76B and 76C, respectively, and open or close the paying outlets 29 and 30. The arrangement of shutters 77A and 77B are such that they move vertically as an arm 97 is rotated with a shaft 98 as its center by transforming the reciprocating movement of the solenoids 76B and 76C to rotational movement via a link (not shown) and can be changed over to a closing position like the shutter 77A or an opening position like the shutter 77B.

Incidentally, the reference code S in FIG. 12 denotes a sensor, and this sensor S detects the presence of bills on the receiving plate 71 by applying a ray of light onto the bills on the receiving plate 71.

Next, description will be made of the operation of the bill-paying machine.

(I) This bill-paying machine starts its operation on the condition that either of the two operators, situated on the right- and left-hand sides, issues an instruction for payment, and delivers a specified number of bills sent out from each bill container 21 to 23 by the transport device 26.

(II) The receiving plate 71 is moved for standby to the opposite side of an operator (hereinafter called one operator) who issues an instruction for payment. At the same time, the bill-arranging plate 70 is pivotally lowered to the position shown by a chain line in FIGS. 12 and 18. Furthermore, the bill-holding plates 72A and 72B are pivotally raised to the position shown by a solid line in FIG. 17 by pivotally raising the stopper 89.

Figure 19:
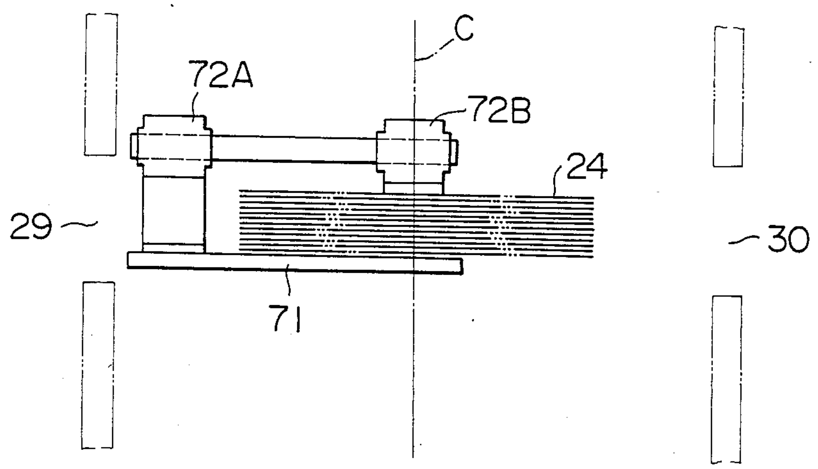

(III) When a specified number of bills are delivered from the transport device without abnormalities, the bill-holding plate 70 is pivotally raised, as shown by the solid line in FIGS. 12 and 18, pays out the bills to the front side of the machine (right-hand in FIG. 12), mounting the bills 24 on the receiving plate 71. Then, as the bill-arranging plate 70 is brought into contact with the ends of the bills 24, the end surfaces of the bills 24 are arranged between the bill-arranging plate 70 and the shutters 77A and 77B in the closed state. At this juncture, as shown in FIG. 19, the bills 24 are fed practically into the center between the paying outlets 29 and 30 (this central line is shown by a chain line C), and are mounted on the receiving plate 71 on standby on the other operator's side (i.e., the side of the paying outlet 29) with their right-hand halves protruding therefrom. Incidentally, since the end portions of the bills protruding from the receiving plate 71 are guided by upper and lower guide plates 99 and 100 secured onto the machine between the paying outlets 29 and 30, as shown in FIG. 13, there is no possibility of any occurrence of jamming at the time of paying out.

(IV) When the bills 24 are mounted on the receiving plate 71, the sensor S operates and the solenoid 76D is actuated, lowering the stopper 89. Then, the bill-holding plates 72A and 72B are pivotally lowered, urged by the torsion springs 88A and 88B, respectively. However, since the receiving plate 71 is disposed at a position closer to the left-hand side in FIG. 19, the bills 24 are clamped between the right-hand bill-holding plate 72B and the receiving plate 71. Incidentally, the left-hand bill-holding plate 72A is pivotally lowered to come into contact with the receiving plate 71.

Figure 20:
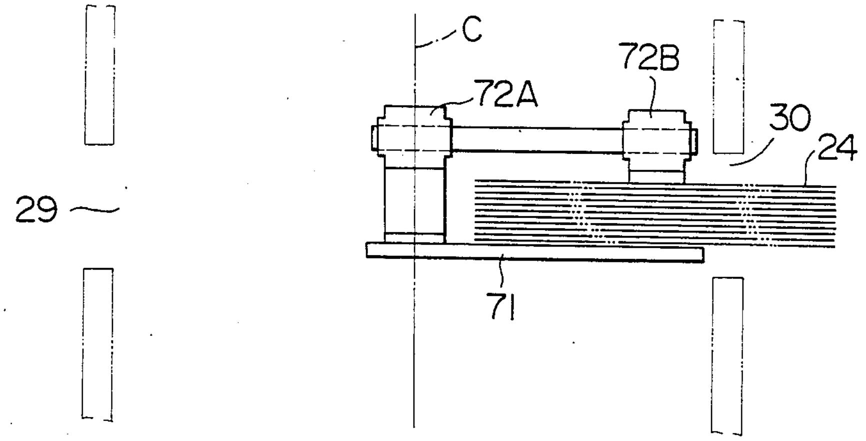

(V) On condition that the bills 24 are clamped and the shutter 77B to which an instruction for payment has been issued is opened, the driving motor 73 is operated, and the receiving plate 71 and the bill-holding plates 72A and 72B are moved horizontally as they are interlocked. Then, as shown in FIG. 20, when the receiving plate 71 moves to the paying outlet 30, the right-hand end portions of the bills 24 are pushed out from the paying outlet 30, i.e., the paying outlet for which an instruction for payment has been issued.

(VI) On condition that the bills 24 have been taken out, the shutter 77B is closed, the stopper 89 is raised, and the bill-holding plates 72A and 72B are forcibly raised in a pivotal manner. Additionally, when the bill-holding plate 70 is pivotally lowered, the preparatory state of the next paying operation is ready. Incidentally, when the next instruction for payment is issued by the opposite (the other) operator, the movement of the receiving plate 71 in the aforementioned step (II) is omitted.

Next, description is made of how the function of the distributing device is affected by the relative dimensions of the width $l_1$ of bills, the width $l_2$ of the receiving plate 71, and the mutual distance $W_2$ between paying outlets 29 and 30 ($W_2=W-2W_1$).

In other words, according to the aforementioned embodiment, L is set slightly larger than $l_1$, and 2L, slightly larger than $W_2$, but it is possible to enlarge the amount of protrusion of the bills from the paying outlet 29 (30) by making L smaller, which enlarges the stroke of the receiving plate 71 in the case of a fixed width W'. (However, since the amount of protrusion of bills from the receiving plate then becomes large, it becomes necessary to take into consideration such possible measures as making the holding power of the bill-holding plates greater.) In addition, by making $W_2$ smaller, it is possible to shorten the overall width W of the bill-paying machine and stabilize the bills on the receiving plate 71. (However, the amount of protrusion of the bills from the paying outlet 29 (30) becomes small, resulting in deteriorated efficiency in the taking-out operation.)

Accordingly, in this second embodiment, the relative relationship is such that L is set slightly smaller than $l_1$, and 2L, slightly larger than $W_2$, by taking into account such factors as the widthwise dimension of the machine, the amount of protrusion of bills from the paying outlet, and the stability of bills on the receiving plate.

In the bill-paying machine described in the second embodiment, the receiving plate 71 is moved unidirectionally between the two paying outlets, so that it is possible to simplify a positioning-controlling device for determining the stop position of the receiving plate 71, as compared, for instance, with the case of distributing bills into the right- and left-hand sides,by setting the receiving plate 71 on standby in the central portion. In addition, according to this second embodiment, since the distribution is effected by the horizontal movement of the receiving plate 71, the structure of the distributing device can be simplified as compared with the first embodiment in which the vertical feed and horizontal feed are used in common.

Furthermore, according to the bill-paying machine according to this second embodiment, since the distributing device and the like are housed inside the front door, as in the case of the first embodiment, the distributing device 31A does not act as a hindrance to conducting the replacement of bill containers 21, 22, and 23 or the maintenance of the transport device 26 and the like. Hence, work efficiency connected with these operations can be enhanced.

As explained above, the bill-paying machine of the invention is characterized in that the housing constituting the external appearance thereof comprises the body with its front open and the front door openably attached to a front end of the body in such a manner as to cover the opening of the body, the front door being provided with two paying outlets, one for each of two operators, and inside the body is provided bill containers, a bill-paying-out device for paying out a specified number of bills from the bill containers, and a transport device for transporting bills from the bill-paying-out device to the distributing device inside the front door. Hence, the restriction imposed from the body side on the distributing device is practically confined to that on the position of communication with the transport device, with the result that the dimensions of the distributing device per se and the amount of movement of bills by means of the distributing device can be set relatively freely. Therefore, it becomes possible to set the paying outlets at such a position as will facilitate handling by operators, irrespective of the devices on the body side and the amount of space, etc. left on the body side. Additionally, at the time of performing maintenance, such as replacement of containers and inspection of the devices inside the body, the distributing device does not act as a hindrance if the front door is opened. Thus, as compared with conventional bill-paying machines, the bill-paying machine of the invention enhances freedom of design and efficiency of maintenance.

What is claimed is:

1. A bill-paying machine disposed between two operators, each operator being situated on one of right- and left-hand sides of said bill-paying machine and said bill-paying machine being used in common by the two operators, said bill-paying machine comprising:
- a box-like body having an opening in its front,
- a front door pivotally mounted at said opening of said body to cover said opening of said body,
- bill containers provided inside said body for housing bills,
- a paying-out device for paying out from said bill containers a predetermined number of bills in accordance with an instruction for payment issued by an operator,
- a transport device mounted in said body for feeding the bills paid out by said paying-out device to said front of said body,
- said bill containers being detachably installed in said body through said opening,
- two paying outlets corresponding to each operator, said paying outlets being formed in a row on the right- and left-hand sides in said front door, and
- a distributing device mounted in said front door for distributing and sending out the bills fed by said transport device to each paying outlet, said distributing device including a receiving plate horizontally positioned for receiving the bills from the transport device and said receiving plate being movable vertically and horizontally from a position adjacent to said transport device to a position for directing the bills to one of said two paying outlets while said receiving plate remains horizontal.

2. A machine according to claim 1 wherein said bills are fed across the front end of said body to said distributing device located inside said front door.

* * * * *